United States Patent
Ge et al.

(10) Patent No.: US 9,541,027 B2
(45) Date of Patent: Jan. 10, 2017

(54) SYSTEM AND METHOD FOR RECOVERING WASTE HEAT

(71) Applicant: Caterpillar Inc., Peoria, IL (US)

(72) Inventors: Xinyu Ge, Peoria, IL (US); Huateng Yang, West Bloomfield, MI (US)

(73) Assignee: Caterpillar Inc., Peoria, IL (US)

( * ) Notice: Subject to any disclaimer, the term of this patent is extended or adjusted under 35 U.S.C. 154(b) by 363 days.

(21) Appl. No.: 14/329,668

(22) Filed: Jul. 11, 2014

(65) Prior Publication Data

US 2016/0010588 A1    Jan. 14, 2016

(51) Int. Cl.
| | |
|---|---|
| F01K 23/10 | (2006.01) |
| F02G 3/00 | (2006.01) |
| F02G 1/04 | (2006.01) |
| F02G 5/04 | (2006.01) |
| F02G 1/055 | (2006.01) |

(52) U.S. Cl.
CPC ................. *F02G 5/04* (2013.01); *F02G 1/055* (2013.01); *F02G 2262/00* (2013.01); *Y02T 10/166* (2013.01)

(58) Field of Classification Search
CPC .......... F02G 5/04; F02G 1/057; Y02T 10/166
USPC ............................ 60/616–620, 517, 520, 526
See application file for complete search history.

(56) References Cited

U.S. PATENT DOCUMENTS

| | | | |
|---|---|---|---|
| 3,948,053 A | 4/1976 | Gamell | |
| 4,031,705 A | 6/1977 | Berg | |
| 6,450,283 B1 | 9/2002 | Taggett | |
| 7,448,213 B2 | 11/2008 | Mitani | |
| 7,891,186 B1 | 2/2011 | Primlani | |
| 7,984,684 B2 | 7/2011 | Hinderks | |
| 2007/0227144 A1* | 10/2007 | Yaguchi et al. | .......... F02G 5/02 60/618 |
| 2008/0041046 A1 | 2/2008 | Bering | |
| 2013/0067910 A1 | 3/2013 | Ishiguro et al. | |

FOREIGN PATENT DOCUMENTS

| | | |
|---|---|---|
| CN | 203175701 U | 9/2013 |
| JP | 2002266701 A * | 9/2002 |
| WO | 9942718 A1 | 8/1999 |

(Continued)

OTHER PUBLICATIONS

Machine generated English translation of JP 2002266701 A, published on Sep. 2002.*

*Primary Examiner* — Thai Ba Trieu
*Assistant Examiner* — Ngoc T Nguyen
(74) *Attorney, Agent, or Firm* — Baker & Hostetler LLP

(57) ABSTRACT

The disclosure relates to a system and method for recovering waste heat to improve the response and fuel economy of a machine. The system includes a heat recovery apparatus and an engine. The heat recovery apparatus has a cold cylinder, a first piston disposed in the cold cylinder, a hot cylinder, a second piston disposed in the hot cylinder, and a regenerator. The first piston and the second piston are in fluid communication with one another via the regenerator. The engine produces heat from multiple sources. A first heat source produced by the engine is thermally coupled to the regenerator and a second heat source produced by the engine is thermally coupled to the hot cylinder. The heat recovery apparatus is configured to convert the heat generated by the first and second heat sources into mechanical energy.

16 Claims, 3 Drawing Sheets

(56) References Cited

FOREIGN PATENT DOCUMENTS

| WO | 2010063368 A1 | 6/2010 |
| WO | 2012125156 A1 | 9/2012 |
| WO | 2013175238 A1 | 11/2013 |

* cited by examiner

SYSTEM AND METHOD FOR RECOVERING WASTE HEAT

TECHNICAL FIELD

This disclosure relates generally to a machines having internal combustion engines, and more particularly, to a system and a method for recovering waste heat to improve the response and fuel economy of the machine.

BACKGROUND

Heat recovery systems for machines having an internal combustion engine are known for extracting useful energy from the exhaust stream generated by the internal combustion engine. These systems are used to increase the efficiency of the machine and to minimize energy lost in the form of waste heat. The process involves capturing the waste heat and converting it into a form of mechanical energy. The mechanical energy can then provide power back to the machine.

A variety of systems for converting waste heat into mechanical work have been applied, such as, for example, turbochargers, Rankine cycles, Stirling engines, or the like. However, many of these techniques use only one heat source and provide power directly back to the engine or compressor, requiring complex mechanical linkages and control devices.

International Application Publication WO2010063368 (hereinafter "the '368 publication"), purports to describe a motor vehicle having a waste heat recovery device for using a plurality of waste heat sources of a motor vehicle by converting the useable waste heat into mechanical work and/or electrical energy. According to the '368 publication, a Rankine cycle converts waste heat from the engine into mechanical work, and a current generator or electric motor transforms the mechanical work into electric energy. However, the Rankine cycle of the '368 publication may be expensive, complex, difficult to package within a machine, or combinations thereof.

Thus, an improved heat recovery system for converting waste heat into useable energy is desired to improve the fuel economy and power response of a machine.

SUMMARY

An aspect of the present disclosure provides a system for recovering waste heat in a machine. The waste heat recovery system includes a heat recovery apparatus and an engine. The heat recovery apparatus includes a cold cylinder, a first piston disposed in the cold cylinder, a hot cylinder, a second piston disposed in the hot cylinder, and a regenerator. The first piston and the second piston are in fluid communication with one another via the regenerator. The engine produces heat from multiple sources. A first heat source is thermally coupled to the regenerator and a second heat source is thermally coupled to the hot cylinder. The heat recovery apparatus is configured to convert heat generated from the first heat source and the second heat source into mechanical energy through motion of the first piston and the second piston.

Another aspect of the present disclosure provides a method for recovering waste heat from a system. The system includes a heat recovery apparatus and an engine. The heat recovery apparatus includes a cold cylinder, a first piston disposed in the cold cylinder, a hot cylinder, a second piston disposed in the hot cylinder, and a regenerator. The first piston and the second piston are in fluid communication with one another via the regenerator. The method includes transferring heat at a first temperature from the engine to the regenerator and transferring heat at a second temperature from the engine to the hot cylinder. The second temperature is higher than the first temperature. The method further includes converting the heat at the first temperature and the heat at the second temperature into mechanical energy via the heat recovery apparatus.

Another aspect of the present disclosure provides a propulsion machine including an engine, a heat recovery system, an energy storage mechanism, and a motor. The engine generates a primary mechanical energy and produces heat from multiple sources. The heat recovery system is thermally coupled to the engine and is configured to convert heat from the multiple heat sources into recovered mechanical energy. The heat recovery system includes a cold cylinder, a hot cylinder, and a regenerator. The cold cylinder and the hot cylinder are in fluid communication with one another via the regenerator. A first heat source produced by the engine is thermally coupled to the regenerator and a second heat source produced by the engine is thermally coupled to the hot cylinder. The energy storage mechanism is coupled to the heat recovery system and configured to store the recovered mechanical energy produced by the heat recovery system. The motor is coupled to the engine and the energy storage mechanism, wherein the primary mechanical energy produced by the engine and the recovered mechanical energy stored in the energy storage mechanism are provided to the motor.

DETAILED DESCRIPTION

The disclosure relates generally to a system and a method for recovering waste heat generated by a heat engine, such as an internal combustion engine, to improve the fuel economy of the engine, increase power output from the engine, shorten response time of the engine, combinations thereof, or otherwise improve engine performance. The waste heat is recovered through conversion into mechanical energy and then stored within an energy storage mechanism.

Figure 1:
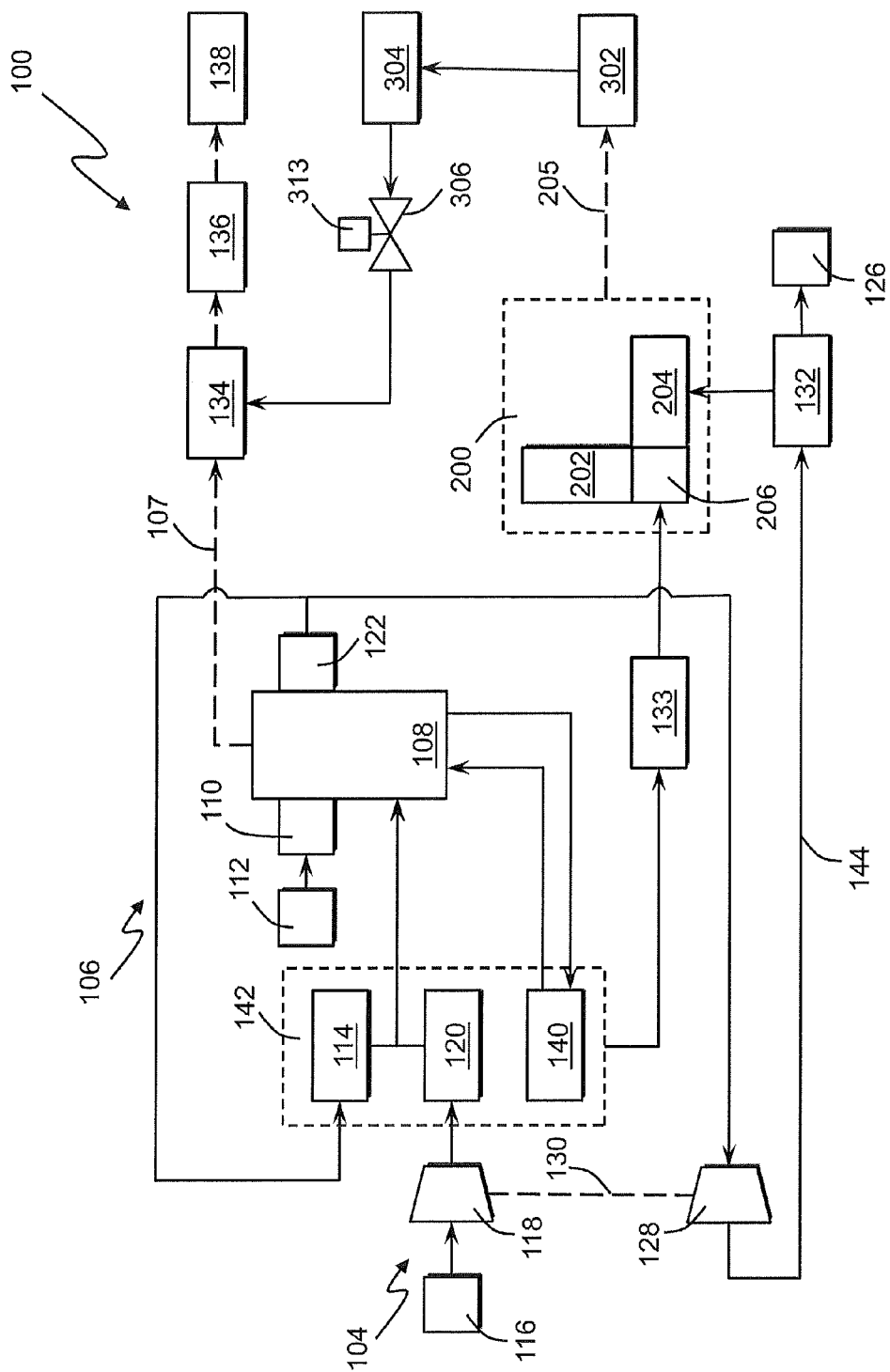
FIG. 1 is a schematic of a waste recovery system, according to an aspect of the disclosure.

FIG. 1 illustrates a schematic of a waste heat recovery system 100 that may be used in a marine application, according to an aspect of the disclosure. In this view, an internal combustion engine 108 is shown having a fuel supply 112, an air intake system 104, and an exhaust system 106. During a combustion process, air and fuel flow into the engine 108, whereby the fuel may auto-ignite or ignite by an ignition mechanism (not shown). After the combustion process, the exhaust gases exit through the exhaust system 106.

The fuel supply 112 may include a fuel supply tank, fuel control valve, and a fuel pump. Other components may be used for supplying fuel to the engine 108 including filters, rack control valves, relief valves, or the like, none of which are shown in FIG. 1 to promote clarity of other features. The fuel may be directly injected into the engine 108 by a fuel injector 110 coupled to the engine 108. It will be appreciated that in other aspects of the disclosure, the engine 108 may comprise an intake manifold, whereby the fuel may be combined with air prior to entering the engine 108.

The air intake system 104 includes an air inlet 116, a compressor 118, and an intake air heat exchanger 120. The air inlet 116, which may include a filter, supplies intake air to the air intake system 104. The intake air flows through the compressor 118, through the intake air heat exchanger 120, and into the engine 108, where it is combined with fuel and burned. It will be appreciated that the engine 108 may also be normally aspirated, and therefore not include a compressor 118, an intake air heat exchanger 120, or both.

After the fuel and air flow through their corresponding supply systems, they may enter into a cylinder (not shown) in the engine 108. The cylinder includes a piston (not shown) that is movable within the cylinder between a top dead center position and a bottom dead center position in a conventional manner to induce rotation of a crankshaft (not shown). It will be appreciated that there may be several cylinders, commonly six, eight, twelve or more cylinders, each having a piston reciprocable therein to contribute to the rotation of the crankshaft. During a combustion process, the air/fuel mixture is ignited, thereby driving the piston and inducing rotation of the crankshaft. Mechanical energy is created by the rotation of the crankshaft. The energy created by the engine 108 may be referred to as the primary mechanical energy 107.

The engine may be cooled by an engine jacket coolant 140. The coolant 140 may be pumped through the engine to absorb heat generated during the combustion process. The coolant 140 may be air or a type of antifreeze and/or water mixture, or other such coolants as are known in the art. After the coolant 140 leaves the engine, it may be cooled and recirculated through the engine 108.

The engine 108 may be operatively coupled to a motor 134. The energy produced by the engine 108 may be in the form of mechanical energy produced by a rotating shaft (not shown). The energy is transferred to the motor 134, whereby the energy is transmitted and/or modified by a transmission 136. The energy is then used to provide power to a propeller 138. The motor 134 is not be limited to a single embodiment, and may include a variety of motors, including a torque converter hydraulic motor, an electric motor, an outboard motor, or other type of motor configured to power a propeller.

After the combustion process, the exhaust gas created during combustion flows through the exhaust system 106 from an exhaust manifold 122. The exhaust may be recirculated back to the engine 108 through an exhaust gas recirculation (EGR) system. The EGR system may include an EGR cooler 114 and an EGR control valve (not shown). After the exhaust flows through the EGR heat exchanger 114 and prior to entering the engine 108, the exhaust will mix with the air from the air intake system 104. The exhaust may also be thermally coupled to an exhaust heat exchanger 132. The exhaust heat exchanger 132 is positioned between the exhaust manifold 122 and an exhaust outlet 126. A turbine 128 may be positioned between the exhaust manifold 122 and the exhaust heat exchanger 132. The turbine 128 may be a part of a turbocharger 130, which may also include the compressor 118.

The heat from the exhaust exiting the engine 108 and passing through the turbine 128 may define a high availability heat source 144. Unless specified otherwise herein by express statement or by context, the term "availability" is used to describe thermodynamic availability, for example, a thermodynamic potential to perform work.

The high availability heat source 144 is thermally coupled to a Stirling engine 200, via the exhaust heat exchanger 132. Heat from the heat source 144 is transferred to the Stirling engine 200 and converted into mechanical work. This form of mechanical work may be referred to as recovered mechanical work 205. In other embodiments, the Stirling engine may be replaced by other heat recovery devices or apparatuses that may be used to convert heat into mechanical work. It will be appreciated that one or more heat recovery devices may be used to recover waste heat.

The EGR heat exchanger 114, intake air heat exchanger 120, the engine jacket coolant 140, or combinations thereof may compose a low availability heat source 142. According to an aspect of the disclosure, the temperature of the low availability heat source 142 is lower than the temperature of the high availability heat source 144. The low availability heat source 142 is thermally coupled to the Stirling engine 200, via a low availability heat exchanger 133. The Stirling engine 200 may convert heat recovered from each into recovered mechanical work 205. It will be appreciated that other heat exchangers or components giving off heat may compose at least a portion of the low availability heat rejection 142.

The recovered mechanical energy 205 produced by the Stirling engine 200, in the form of a rotating or reciprocating shaft 214 (FIG. 2), may be used to power a hydraulic pump 302. The hydraulic pump 302 may pump hydraulic fluid (not shown) into a hydraulic accumulator 304 that may store the recovered mechanical energy 205 from the waste heat in the form of fluid pressure. The stored mechanical energy may then be selectively transferred to the motor 134 via a motor valve 306.

Figure 2:
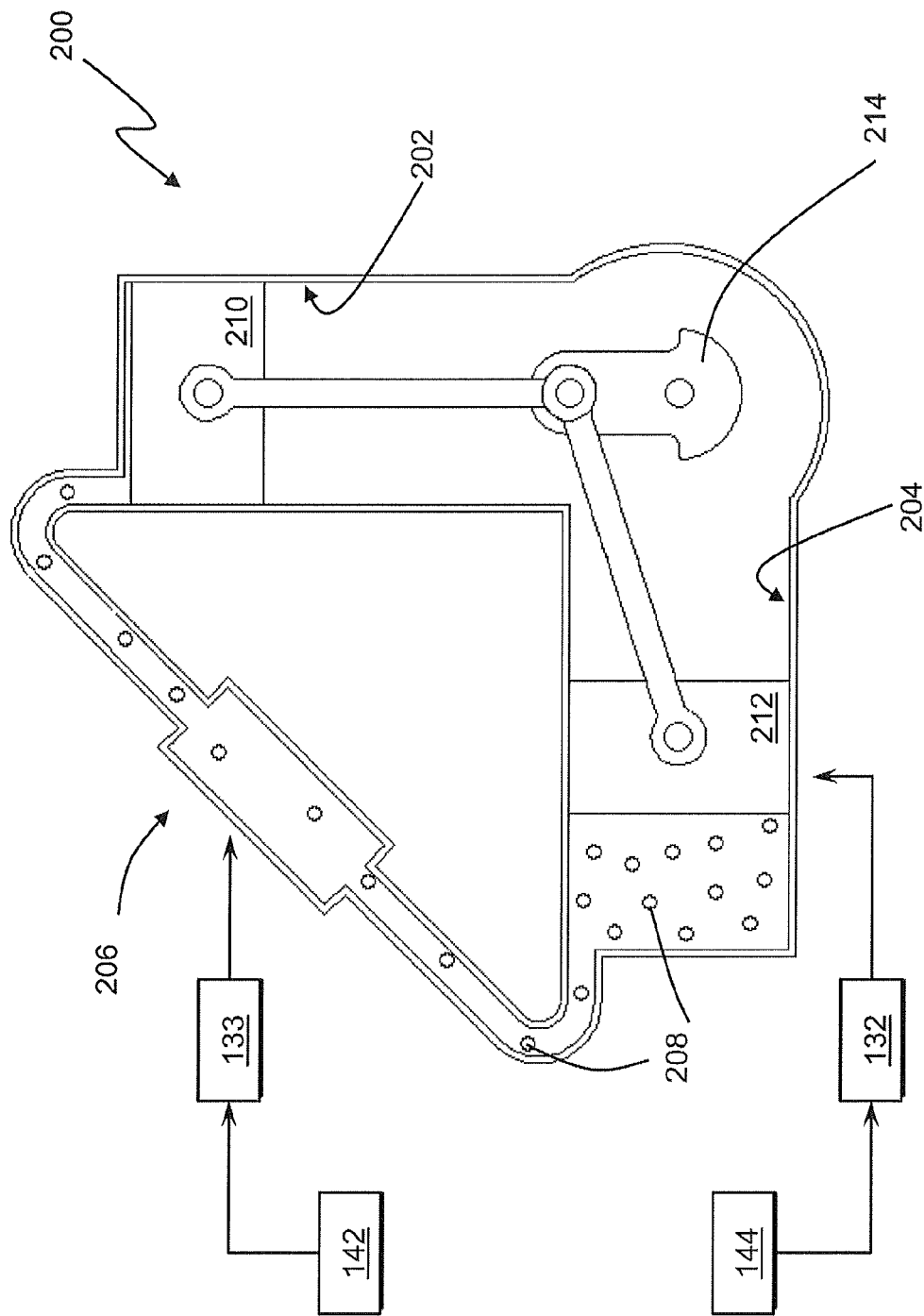
FIG. 2 is an illustration of a Stirling engine, according to an aspect of the disclosure.

FIG. 2 illustrates a Stirling engine 200, according to an aspect of the disclosure. A Stirling engine uses a Stirling cycle which utilizes an external heat source or heat sources to produce mechanical work. The Stirling engine 200 comprises two cylinders, a cold cylinder 202 and a hot cylinder 204, and a regenerator 206 in fluid communication with the cold cylinder 202 and the hot cylinder 204. The Stirling engine 200 further comprises a working fluid or gas 208, which is sealed within. The cold cylinder 202 and the hot cylinder 204 contain a cold piston 210 and a hot piston 212 therein, respectively. The cold piston 210 and the hot piston 212 are in fluid communication with one another via the regenerator 206. As the working fluid 208 expands and contracts within the Stirling engine, a power output shaft 214 is rotated by reciprocating motion of the pistons 210 and 212, which converts the external heat into recovered mechanical work 205.

The operation of the Stirling engine 200 may be depicted according to the following steps. In the first step, heat is provided to the hot cylinder 204 which increases the pressure of the working fluid 208 within the hot cylinder 204. The hot piston 212 is forced to the right, as the elements are arranged in FIG. 2, as the working fluid 208 expands. The work performed on the hot piston 212 by the working fluid 208 rotates the power output shaft 214. During this expansion stroke of the hot piston 212, the volume of the working fluid 208 in the cold cylinder 202 remains substantially unchanged.

In the second step, the hot piston 212 moves to the left and the cold piston 210 moves down, as the elements are arranged in FIG. 2. The working fluid 208, sealed within the Stirling engine 200, flows through the regenerator 206 and into the cold cylinder 202. During this intake stroke of the cold cylinder, the working fluid 208 may transfer heat to a structure of the regenerator 206, and store heat therefrom in a thermal capacitance of the regenerator 206. The regenerator 206 may include heat storage media (not shown) for the purpose of augmenting the thermal capacitance of the regenerator 206.

In the third step, the cold piston 210 is driven up by the power output shaft 214, as the elements are arranged in FIG. 2, which compresses the working fluid in the cold cylinder 202. The cold cylinder 202 may be air cooled and may have fins on a side wall (not shown) for transferring heat to a low temperature sink or an ambient environment of the Stirling engine 200. During this compression stroke of the cold piston 210, the volume of the working fluid 208 in the hot cylinder remains substantially unchanged, in part because heat transfer out of the cold cylinder 202 curtails pressure build up in the cold cylinder 202 during the compression stroke. The volume of the working fluid 208 is at a minimum at the top of the cold cylinder 202 compression stroke.

In the fourth step, after the cold piston 210 has moved up, the hot piston 212 moves towards the right, as the elements are arranged in FIG. 2. This forces the working fluid 208 through the regenerator 206, where the working fluid 208 may receive heat stored in the thermal capacitance of the regenerator 206. In turn, the pre-heated working fluid 208 will undergo a subsequent Stirling cycle, beginning at step one above.

The regenerator 206 is used to take heat from the working fluid 208 during step two and to return the heat to the working fluid 208 during step four. After the second step, the heat is temporarily stored within the regenerator 206, and subsequently returned to the working fluid 208 after step 3. The regenerator 206 may comprise wire mesh screens or other materials creating a porous medium for promoting heat storage by augmenting thermal capacitance and enhancing local heat transfer rates in the regenerator 206.

In an embodiment, the heat provided to the hot cylinder 204 is from the high availability heat source 144. The hot cylinder 204 is thermally coupled to the high availability heat source 144 via the exhaust gas heat exchanger 132. Additionally, heat from the low availability heat source 142 may be provided to the regenerator 206, whereby the regenerator 206 is thermally coupled to the low availability heat source 142 via the low availability heat exchanger 133. Accordingly, heat from both the low availability and high availability heat sources 142, 144 may be converted into mechanical work by the Stirling engine 200.

Figure 3:
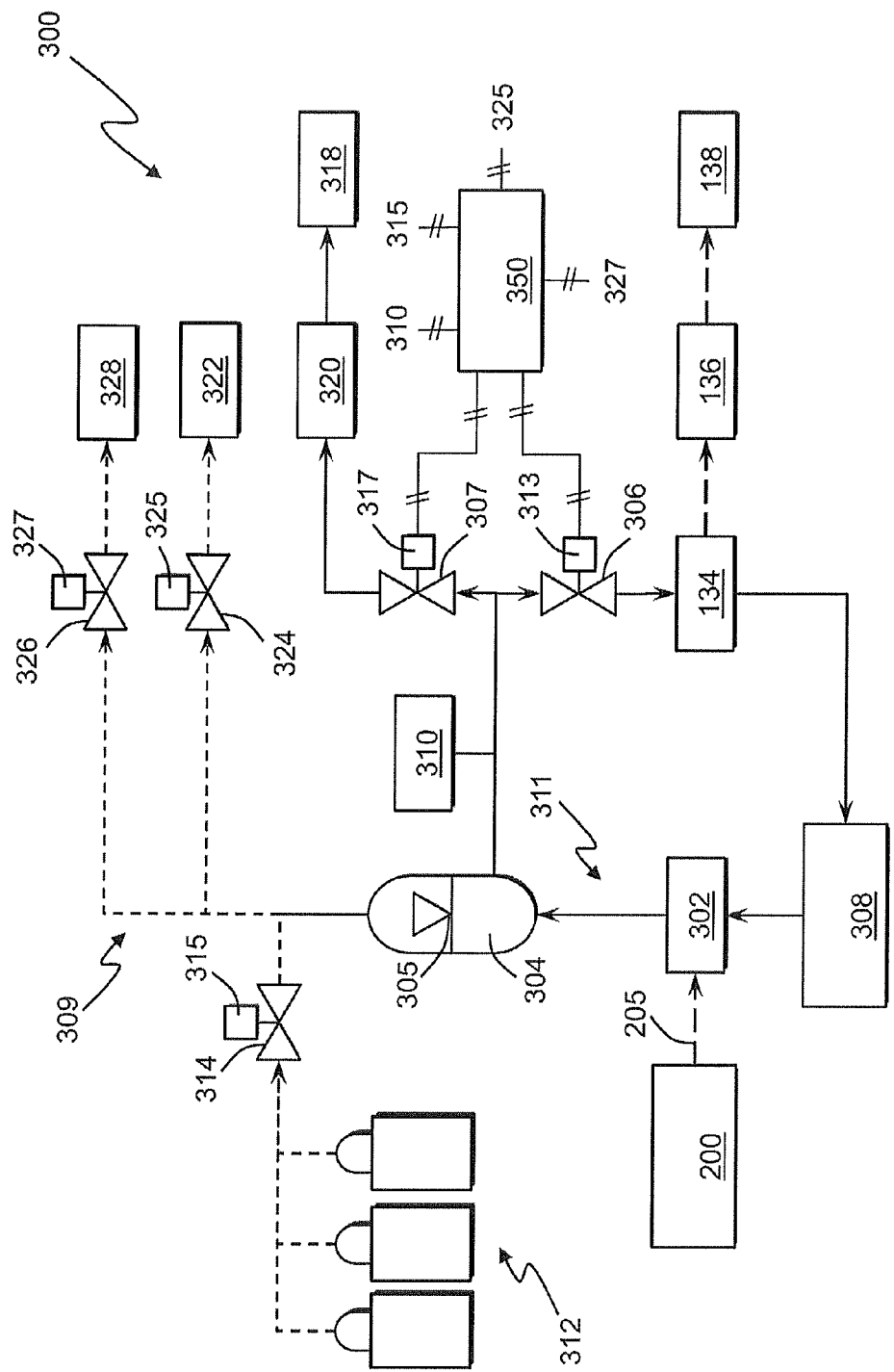
FIG. 3 is a schematic of a hydraulic accumulator system, according to an aspect of the disclosure.

FIG. 3 illustrates a hydraulic accumulator system 300, according to an aspect of the disclosure. The hydraulic accumulator system 300 is an energy storage mechanism which may store the recovered mechanical energy 205 produced by the Stirling engine 200 or other heat recovery apparatus in the form of pressurized fluid. In some embodiments the recovered energy 205 may be transmitted in the form of a rotating or reciprocating shaft coming from the Stirling engine 200. It will be appreciated that the energy 205 may be transmitted via other means.

In the aspect illustrated in FIG. 3, the recovered energy 205 produced by the Stirling engine 200 powers the hydraulic pump 302. The hydraulic pump 302 pumps hydraulic fluid from a low pressure hydraulic supply 308 into an accumulator 304, whereby the pressure may be sensed by a pressure gauge 310. The accumulator 304 may be a piston accumulator or other fluid energy storage device known in the art. The accumulator 304 includes a working gas which may be nitrogen or other compressible medium. The working gas and the hydraulic fluid are separated by a piston or membrane 305, such that as the hydraulic fluid is pumped into the accumulator 304, the pressure of the working gas increases. Multiple supply tanks 312 may be used to supply the working gas to the accumulator 304. This increases the scalability of the accumulator 304 and allows for more energy to be recovered by increasing the amount of hydraulic pressure that can be stored. The accumulator 304 may access the supply tanks 312 via a supply valve 314. The flow of the working gas is illustrated by the working gas lines 309 (dashed) and the flow of the hydraulic fluid is illustrated by the hydraulic flow lines 311 (solid). It will be appreciated that valves may include needle control valves, ball control valves, or other types of valves that allow and restrict the flow of a fluid or gas.

The hydraulic accumulator 304 may release the high pressure hydraulic fluid to rotate the motor 134, via a motor valve 306. In the illustrated embodiment, the motor 134 is a torque convertor hydraulic motor. The hydraulic motor 134 converts the high pressure hydraulic fluid back into mechanical energy, whereby the mechanical energy is transmitted by the transmission 136 to a load 138. According to an aspect of the disclosure, the load 138 is a marine propeller driven by shaft power from the motor 134 via the transmission 136. The stored mechanical energy supplied to the motor 134 may be used in conjunction with the primary mechanical power 107 transferred to the motor 134 from the IC engine 108, creating a series-parallel hybrid power source. It will be appreciated that the motor may also be powered individually by either the stored energy or the primary energy 107. According to another aspect of the disclosure, the transmission 136 receives shaft power directly from the engine 108 and the motor 134 in a parallel hybrid arrangement.

It will be appreciated that the hydraulic accumulator system 300 may be replaced by other energy storage means, including batteries, mechanical flywheels, electromagnetic storage or the like. The other energy storage means may be configured to transfer mechanical energy to the motor 134.

The hydraulic accumulator 304 may also release high pressure hydraulic fluid to provide power for an actuation system 320 of a variable pitch propeller (VPP) 318, via VPP control valve 307. The variable pitch propeller 318 may include blades that can be adjusted to a variety of angles to change the propeller performance. The actuation system 320 may be used to adjust the position or inclination of the blades.

The hydraulic accumulator system 300 may also provide power to other applications, via the working gas, which require high pressure gas as a power source. The hydraulic system 300 may have a quick connector 322 with connections to the supply tank 312, so that the working gas can be refilled and consumed by onboard applications. The quick connector 322 may access the working gas through control valve 324. In an embodiment, one of the onboard applications may be compressed-air driven tools. Additionally, an extra storage tank (not shown) may be connected to the quick connector 322 to expand the energy storage capacity of the accumulator 304. The stored compressed working gas in the extra storage tank may be rerouted back into the accumulator 304. The working gas may be vented through a manual vent 328 accessible by a vent control valve 326.

The waste heat recovery system 100 may also include a controller 350, such as an electronic control unit, which may be used to facilitate control and coordination of any methods or procedures described herein. The controller 350 may include a processor and memory, neither of which is shown. The processor may be configured to output signals to valve actuators and/or receive values sensed by sensors or gauges, such as temperature and pressure. The output signals and sensed values may be stored in memory and used by the controller 350 to control the storage of recovered energy and to control the expenditure of stored energy through the various loads. In this embodiment, the actuators include a motor valve actuator 313, a supply valve actuator 315, a VPP control valve actuator 317, a control valve actuator 325, and a vent control valve actuator 327 coupled to the motor valve 306, supply valve 314, VPP control valve 307, control valve 324, and vent control valve 326, respectively. A pressure gauge 310 is disclosed, which is coupled to the hydraulic accumulator 304, whereby the pressure of the hydraulic fluid may be sensed. In other embodiments, additional actuators, sensors, or gauges may be used, for example, to sense and control the pressure and temperature of the working gas within the working gas line 309, the hydraulic fluid in the hydraulic flow line 311, and/or the working fluid 208 sealed within the Stirling engine 200. While the controller 350 is represented as a single unit, in other aspects the controller 350 may be distributed as a plurality of distinct but interoperating units, incorporated into another component, or located at different locations on or off the heat recovery system 100.

INDUSTRIAL APPLICABILITY

The present disclosure provides an advantageous system and method for recovering waste heat in a machine having an internal combustion engine. The waste heat recovery system can dramatically save energy, which would otherwise be dispensed without extracting useful work therefrom. Integrating a Stirling thermodynamic cycle, which has a high thermodynamic efficiency relative to a theoretical Carnot efficiency between the same temperature difference, into a machine with an internal combustion engine may reduce the fuel consumption and reduce the operation cost of a propulsion system.

Additionally, by using a scalable energy accumulation system, energy may be recovered and used to provide a secondary power source to the machine. For example, when the waste heat recovery system is used in a marine application, the recovered energy may be directed to adjust the position of a variable pitch propeller, drive a hydraulic motor operatively connected to a propeller, or for other applications associated with the machine. In turn, a maximum power rating of the internal combustion engine for the machine may be reduced because the machine may derive peak transient power from a combination of the primary power and the recovered power. Further, with the help of the energy accumulation system, the machine can improve the response and reduce smoke during transient events, such as acceleration. The machine can also use recovered energy at low speed transient operation, so there are zero emissions from the internal combustion engine.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for recovering waste heat from a system, the system including an engine and a heat recovery apparatus, the heat recovery apparatus including a cold cylinder, a first piston disposed in the cold cylinder, a hot cylinder, a second piston disposed in the hot cylinder, and a regenerator, wherein the first piston and the second piston are in fluid communication with one another via the regenerator, the method comprising:
   transferring heat at a first temperature from the engine to the regenerator;
   transferring heat at a second temperature from the engine to the hot cylinder, the second temperature being higher than the first temperature;
   converting the heat at the first temperature and the heat at the second temperature into mechanical energy through motion of the first piston and the second piston; and
   storing the mechanical energy within an energy storage mechanism, wherein the energy storage mechanism is a hydraulic fluid accumulator.

2. The method of claim 1, further comprising converting, by a motor, the energy in the energy storage mechanism into mechanical energy, wherein the motor is operatively coupled to the hydraulic fluid accumulator.

3. The method of claim 2, further comprising transferring mechanical energy between the engine and the motor, wherein the engine is operatively coupled to the motor.

4. The method of claim 1, wherein the heat recovery apparatus is a Stirling engine.

5. The method of claim 1, wherein the heat at the first temperature is heat from at least one of an exhaust gas recirculation heat exchanger, an intake air heat exchanger, and an engine jacket coolant.

6. The method of claim 1, wherein the heat at the second temperature is from an exhaust gas of the engine.

7. A waste heat recovery system comprising:
   a heat recovery apparatus including a cold cylinder, a first piston disposed in the cold cylinder, a hot cylinder, a second piston disposed in the hot cylinder, and a regenerator, wherein the first piston and the second piston are in fluid communication with one another via the regenerator;
   an engine producing heat from multiple sources, wherein a first heat source is thermally coupled to the regenerator, and a second heat source is thermally coupled to the hot cylinder; and
   an energy storage mechanism, wherein the energy storage mechanism is a hydraulic fluid accumulator,
   wherein the heat recovery apparatus is configured to convert heat generated from the first heat source and the second heat source into mechanical energy through motion of the first piston and the second piston and wherein the mechanical energy produced by the heat recovery apparatus is stored within the hydraulic fluid accumulator.

8. The waste heat recovery system of claim 7, further comprising a motor operatively coupled to the energy storage mechanism for converting energy stored in the hydraulic fluid accumulator into mechanical energy.

9. The waste heat recovery system of claim 8, wherein the engine is operatively coupled to the motor for transferring mechanical energy between the engine and the motor.

10. The waste heat recovery system of claim 7, wherein a temperature of heat transferred through the first heat source is lower than a temperature of heat transferred through the second heat source.

11. The waste heat recovery system of claim 7, wherein the first heat source is heat from at least one of an exhaust gas recirculation heat exchanger, an intake air heat exchanger, and an engine jacket coolant.

12. The waste heat recovery system of claim 7, wherein the second heat source is heat from an exhaust gas of the engine.

13. The waste heat recovery system of claim 12, further comprising a turbocharger in fluid communication with the exhaust gas of the engine.

14. The waste heat recovery system of claim 7, wherein the heat recovery apparatus is a Stirling engine.

15. A propulsion machine comprising:
 an engine for generating primary mechanical energy, wherein the engine produces heat from multiple sources;
 a heat recovery system thermally coupled to the engine, and configured to convert heat from multiple heat sources into recovered mechanical energy, the heat recovery system having a cold cylinder, a hot cylinder, and a regenerator, wherein the cold cylinder and the hot cylinder are in fluid communication with one another via the regenerator, and wherein a first heat source produced by the engine is thermally coupled to the regenerator and a second heat source produced by the engine is thermally coupled to the hot cylinder;
 an energy storage mechanism coupled to the heat recovery system, and configured to store the mechanical energy produced by the heat recovery system; and
 a motor coupled to the engine and the energy storage mechanism, wherein the mechanical energy produced by the engine and the mechanical energy stored in the energy storage mechanism are provided to the motor.

16. The machine of claim 15, wherein the propulsion machine is a marine vessel.

\* \* \* \* \*